United States Patent [19]

Benton et al.

[11] Patent Number: 4,761,084

[45] Date of Patent: Aug. 2, 1988

[54] BEARING SYSTEM WITH REDUNDANT RACE

[75] Inventors: Max D. Benton, Goleta; Michael R. Everman, Santa Barbara, both of Calif.

[73] Assignee: AEC-Able Engineering Company, Inc., Goleta, Calif.

[21] Appl. No.: 68,564

[22] Filed: Jun. 30, 1987

[51] Int. Cl.⁴ ............................................. F16C 19/30
[52] U.S. Cl. .................................. 384/619; 384/558; 384/559; 384/611; 384/620; 384/622; 384/624
[58] Field of Search ............... 384/619, 624, 558, 559, 384/611, 620, 622, 581, 584, 569

[56] References Cited

U.S. PATENT DOCUMENTS

| | | | |
|---|---|---|---|
| 4,363,608 | 12/1982 | Mulders | 384/619 |
| 4,463,995 | 8/1984 | Andree | 384/624 |
| 4,641,978 | 2/1987 | Kapich | 384/624 |
| 4,664,539 | 5/1987 | Li | 384/624 |

Primary Examiner—Lenard A. Footland
Attorney, Agent, or Firm—Donald D. Mon

[57] ABSTRACT

A redundant-race bearing system according to this invention incorporates a pair of ring-shaped race members. The race members are coaxial and axially spaced apart from one another. Each race member has a radial cross-section that includes a plurality of tracks. These tracks form a confining pattern that enables lateral and axial restraint.

8 Claims, 2 Drawing Sheets

BEARING SYSTEM WITH REDUNDANT RACE

FIELD OF THE INVENTION

This invention relates to a bearing system involving coaxial rotation of two elements. In this invention a pair of bearing races is provided, one of which is redundant so that in the event of disablement of one race, the other can instead be utilized for rotational purposes.

BACKGROUND OF THE INVENTION

To enable coaxial relative rotation of a pair of elements it is established practice to provide a race body on one element and a bearing body on the other element. The two bodies provide a bearing structure that enables relative rotation to occur between the two elements. The bearing bodies may have matching continuous ring-shaped surfaces to make a friction bearing, or rollers or balls to make for roller or ball bearings, for example. In any event, damage to the race destroys its bearing function, and the system must be repaired, usually by replacing the damaged race.

This may not be much of a problem in conventional machinery in convenient locations. In a factory, a large bearing can be dismantled, the damaged parts removed and replaced, and the bearing reassembled. There is no particular difficulty in what is basically a time-consuming inconvenience. However, there are installations wherein such a solution is not acceptable. One example is found in relatively large space-based installations. In such locations the physical effort required to repair a structure in this way is often simply not available, and storage of spare parts is not practicable. The need to wait for replacement parts to be sent aloft, or the need for an astronaut to make substantial exertions to repair the structure can cripple a project.

It is necessary to anticipate that serious damage may be done to bearing systems, for example as the consequence of collision with space junk. Unless the system is inherently provided with means to restore the bearing function without requiring the use of spare or replacement parts, and unless it can be repaired with only minimal physical effort, that system is seriously flawed for such applications.

It is an object of this invention to provide redundancy in a bearing system which enables the ready restoration of function after damage to a race without requiring the use of replacement parts, or of requiring more effort than the loosening, reversal, and retightening of the blocks, or even in some cases more simply, the disablement of a selected part or parts. Replacement parts and their attendant delays and expenses, and repair techniques which require substantial exertion, are thereby eliminated.

BRIEF DESCRIPTION OF THE INVENTION

A redundant-race bearing system according to this invention incorporates a pair of ring-shaped race members. The race members are coaxial and axially spaced apart from one another. Each race member has a radial cross-section that includes a plurality of tracks. These tracks form a confining pattern that enables lateral and axial restraint.

A plurality of mounts interengage both race members. In the broadest form of the invention, each mount has a pair of bearings, each of which engages a respective race member. Unless restrained, both races can actively run through both of said bearings. In one embodiment of the invention, clamp means is provided selectively to disable one or the other of said bearings so that only a selected one of said races runs through its respective bearing at a time. A disabled race can thereby be rendered unnecessary to the relative rotatability of the assembly.

Alternatively, both sets of bearings can be allowed to run. In the event of damage to the race, the bearing function of that race will forthwith cease.

According to the presently preferred embodiment of the invention, each mount is provided with only one bearing block and with a spaced apart clamping block. The mounts are engaged to both races so that all bearing blocks can be applied to one of the races so as to run through them, and all clamping blocks are applied to the other race. The mounts can be reversed so that the clamping blocks and bearing blocks can be applied to the other race, thereby enabling a selection to be made of which race is to be run through the bearings merely by reversing all the mounts.

In all of the foregoing situations, if one of the races is damaged beyond use as a running race, then the other race can be employed instead, without requiring new parts or much exertion. When two sets of bearing blocks are used on a mount without clamp means, damage to one of the races will itself stop the bearing action at the damaged race, and the other race will continue to enable relative rotation of the elements. When clamping means are provided, either one of the bearing blocks can be disabled. When only one bearing block is provided on each mount, the mount can be released and reversed, so that the existing bearing blocks can be used on either one of the races.

The above and other features of this invention will be fully understood from the following detailed description and the accompanying drawings, in which:

DETAILED DESCRIPTION OF THE INVENTION

Figure 1:
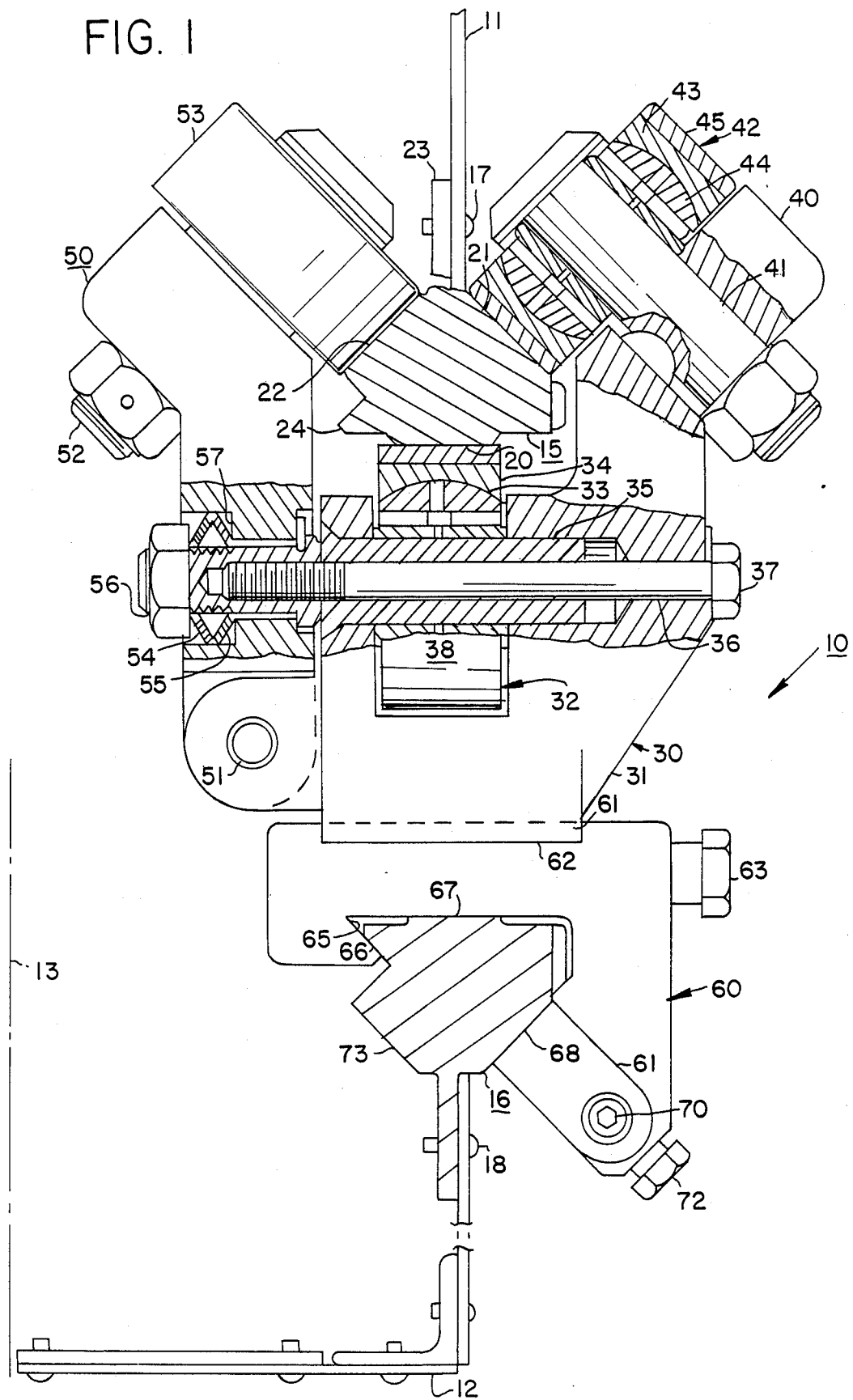
FIG. 1 is a radial cross-section of the presently preferred embodiment of the invention.

FIG. 1 shows a bearing system 10 intended to interconnect and provide for relative rotation between elements 11, 12. These elements may be such as telescope tubes, housings, or any other assembly having a central axis 13 around which they relatively rotate. The terms "counter-rotation" and "relative-rotation" are used synonymously to mean that one element rotates relative to the other, either one of which may be assumed to be standing still or both of which may be assumed to be moving. Which one actually moves along a race is unimportant. It is the relative rotation between the elements that is the concern of this invention.

Whatever the arrangement may be, it is intended that around central axis 13 the two elements 11, 12 can rotate relative to each other, while they are held against axial and radial separation. The nature or kind of elements is of no interest to this invention.

For this purpose there are provided a first race member 15 and a second race member 16. These are circular ring-shaped structures concentric with the central axis. They have geometrically similar structures for reasons to be described. Fasteners 17 join first race member 15 to element 11. Fasteners 18 fasten race member 16 to element 12.

With particular attention to race member 15, it has a radial cross-section which is in the plane of FIG. 1. It includes a base track 20 and a pair of centering tracks 21, 22. These tracks face outwardly from the centroid of the cross-section, meaning that they are on the outside surfaces of this body, facing outwardly. When planar as shown, their extensions form a triangular structure. The tracks are spaced apart from one another around the section, and their corners are shaped for lightness of weight and for another purpose yet to be described. Flange 23 is for the purpose of joining to element 11. A tongue 24 is formed for clamping purposes yet to be described.

A bearing block 30 comprises a body 31 which mounts a first self-aligning roller bearing 32. It is intended to run along base track 20. As a self-aligning bearing it has a central mounting ball 33 with a sleeve 34 fitted to it so as to accommodate angular variations along a line normal to its axis of rotation. Other types of bearings can be used instead, but this will be found to be the most adaptable.

A spindle 35 is provided to mount bearing 32. It fits around a mounting bolt 36 and includes a head 37. This bearing with its roller surface 38 provides bearing support against one of the tracks. An arm 40 on a body 31 supports a spindle 41 to where there is mounted a second roller bearing 42. Bearing 42 includes a central mounting ball 43 and a sleeve 44. This is an easily assembled structure. Its roller surface 45 is intended to run along centering track 21.

A second arm 50 is pivotally mounted at a pivot 51 to body 31. It extends upwardly to a spindle 52 and supports a third roller bearing 53 which is in all details similar to roller bearing 42. It bears against centering track 22. In order better to provide for deviations from true circularity, the second arm is pivoted and also is spring loaded clockwise toward the track. For this purpose two Belleville washers 54, 55 are stacked so as to bear against nut 56 and against shoulder 57 to force the arm in the clockwise direction in FIG. 1. This will keep the bearing block firmly biased against the race structure.

This construction provides three bearings which trap the track so that separative movement in any direction, including axial and radial, is restrained by at least one of the bearings. It will also be seen in FIG. 1 that the bearing block is adapted to move along the track (or stated otherwise, that the race can run through the bearing), and that if its body is attached to some other device, relative rotation is attainable.

For this purpose a mounting block 60 is provided which includes connecting means 61 in the nature of a dovetail track 62 and a bolt 63. This will mount the two blocks together so they can adjustably be shifted radially relative to one another. This adjustment is an optional feature. In fact, the "connecting means" could comprise the two bodies formed as a unitary body, but relative adjustment is a convenience.

It is not intended that mounting blocks 60 move in a running (shear) fashion along race member 16. Instead it is intended that they be clamped strongly on it and prevent such movement. For this reason in the mounting block there is provided a wedge cavity 65 into which tongue 66 corresponding to tongue 24 of the other race member fits so that it jams into that position in cooperation with its base track 67. A clamp 69 is pivotally mounted by pivot 70 in such a way as to be moveable toward and away from centering track 71 by a bolt 72. Tightening the bolt moves clamp 69 toward and against track 71 to make a firm engagement with it. In this arrangement, centering track 73 has no function.

It will now be seen that the cross-sections of the two tracks are congruent, although they need not necessarily be so. In both cases their surfaces are such as to be engageable with both the bearing block and with the mounting block.

In the illustrated structure, the mounting block is shown clamped to the lower race member 16, and the upper race member 15 is relatively movably mounted to the bearing block. So long as no damage is done to race member 15 all is well, and the next assemblies can readily rotate relative to each other with all bearing motion occurring at the first race member, which runs through the bearings.

Assume, however, that serious damage is done to race member 15. Then bearing rotation of member 15 is no longer possible, at least around its entire circumference. In that event, to repair the assembly and restore the function of relative rotation, race member 16 will be used instead and the bearing blocks will be clamped onto race 15, which now can be used for mounting, if not for rotation. All of the mounting blocks will be released by releasing their clamps 69 and all of the bearing blocks will be released by loosening or removing nut 56. Then the assembly of the two blocks is reversed. The bearing blocks will be applied to the lower race member 16, and the mounting blocks will be clamped to the upper race member 15. Now the previously redundant second race member 16 becomes the active race, and thereby becomes the means for the two bodies to rotate relative to one another. Thus, in the event of damage to one of the race members, the complete renovation of the system requires no more than the reversal of the mounting and bearing blocks. This is not a difficult task and may be made even simpler by simplifying the various attaching means. For very large devices such as 10 foot diameter tubes and the like, the more forgiving self-aligning bearings and the freedom for accommodation as provided by arm 40 are usefully provided. For smaller devices, less sophisticated components may be provided.

In any event there exists a device whose life is extended by the simple reversal of a group of parts.

FIG. 1 shows only one mount it being recognized that there will be a plurality of these mounts provided as close together or as far apart as required. In any practical construction there will be at least three mounts, and for larger systems there usually will be more than three. The number of them will be determined by the weight of the next assembly and by the conditions expected to be encountered by the device in use.

The embodiment of FIG. 1 offers a minimized-weight assembly, and has as its trade-off the need to release the bearing blocks and mounting blocks, reverse them so as to fit onto the other race, and tighten them again. This will often be tolerable.

Figure 2:
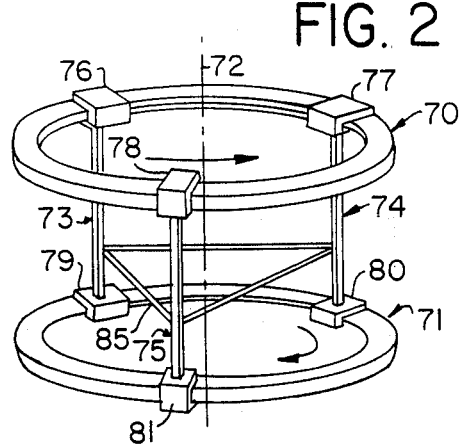
FIG. 2 is a schematic perspective view of another embodiment of the invention.
Figure 3:
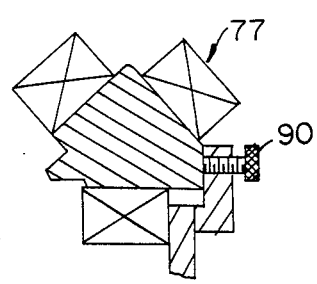
FIG. 3 is a fragmentary semi-schematic view of an alternate feature of the invention.

However, if such a procedure is undesirable then the construction of FIGS. 2 and 3 may be used instead, but with the possible consequence of greater weight. Two races 70, 71 with tracks as provided in FIG. 1, are spaced apart from each other along axis 72. Next assemblies (not shown) will be attached to them. A plurality of mounts 73, 74, 75 each has a pair of sets of bearings 76, 77, 78, 79, 80, 81, each joined by a rigid body 82. Each of these sets of bearings may be identical to bearing mount 30, and serves to provide bearing movement, and to restrain the race against axial or radial movement.

It could be possible for all of the bearing sets to move toward one another long the races, so that axial separative support of the two elements would be insufficient. To prevent this, spacer means 85 such as a spider, or some other type of spacer, will space the bearings apart from one another around the respective races. This is a fully satisfactory bearing system with full redundancy.

In the event that one of the races is seriously damaged, one of the bearings will jam against it. This will disable the damaged bearing, but relative rotation around the axis is still possible by using the other race alone for bearing movement.

It may be undesirable to rely upon the jamming action of the bearing to stop relative movement along damaged segments of the race. In that event, clamp means 90 is provided at each of the bearing sets. This may be as simple as a set screw 91 threaded through the body so it can be tightened against the race. This will prevent further bearing movement at that bearing. This adjustment can be made after damage has occurred. Alternatively, all clamp means can be tightened down against one race so that only the other race is active. Then if the active race is damaged, these clamp means can be released, and the clamp means respective to the damaged race can be tightened down. The result is the same as in the device of FIG. 1, except that no reversal of the parts is required.

In FIGS. 1 and 2, the races lie in parallel planes, axially spaced apart. This is the preferred orientation for most applications. However, for some applications where axial overlap of next assemblies is an objective, it may be preferable to place the two races in the same plane, extending radially. Such an arrangement is shown in FIGS. 4 and 5.

Figure 4:
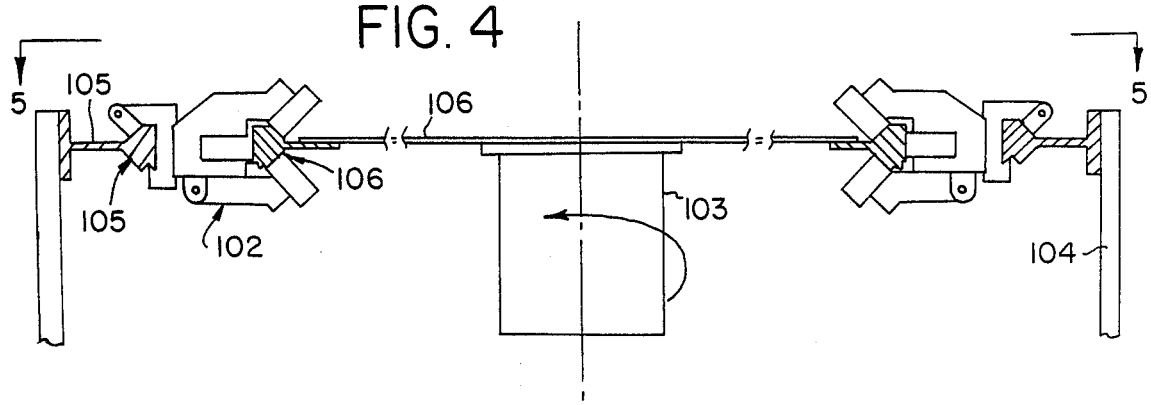
FIG. 4 is a schematic view of yet another embodiment of the invention.
Figure 5:
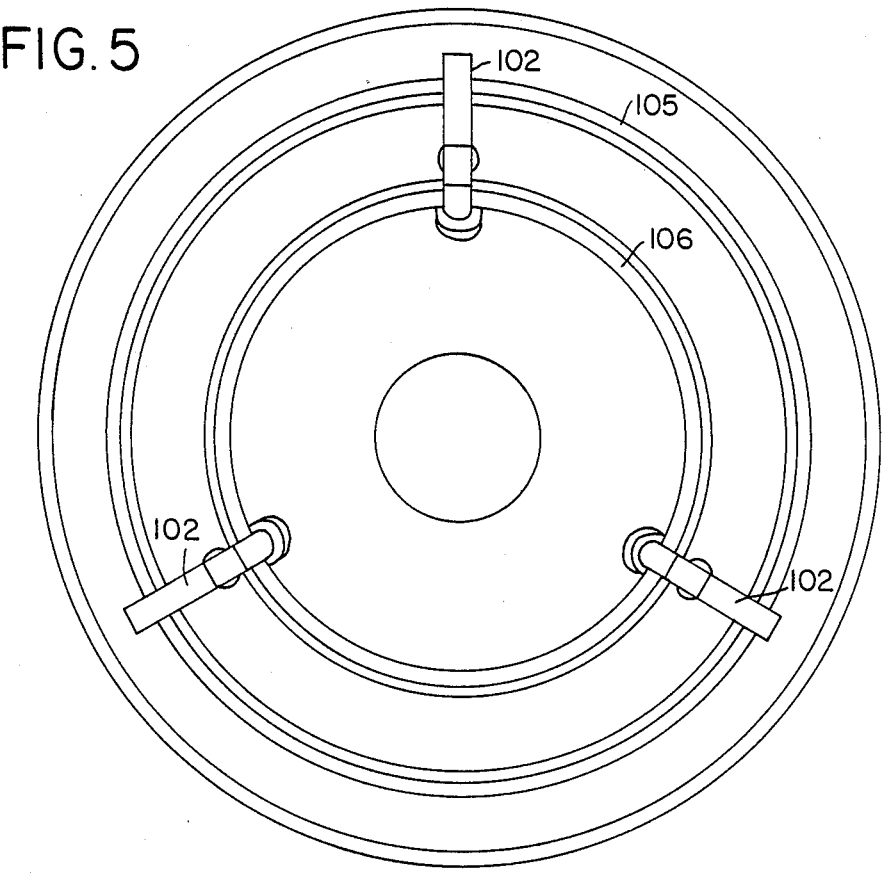
FIG. 5 is a top view of FIG. 4.

In FIGS. 4 and 5, races 100, 101 are co-planar, and are joined by a plurality of mounts 102 (shown semischematically), which are identical to the mounts in FIG. 1. These differ in that assemblies 103, 104 axially overlap, being joined to the mount by flange, 105, 106. The variations disclosed in FIGS. 2 and 3 may be substituted for the illustrated mounts, as preferred.

This invention is not to be limited by the embodiments shown in the drawings and described in the description, which are given by way of example and not of limitation, but only in accordance with the scope of the appended claims.

We claim:

1. A redundant-race bearing system for joining two bodies together for coaxial relative rotation around a central axis, comprising;
 a first and second race member, each of said race members comprising a circular ring-shaped structure concentric with said central axis, each said race member having a radial cross-section which includes a plurality of tracks, said tracks being coaxial, each said track facing externally on its respective race member;
 a plurality of mounts, each mount comprising a bearing block, each bearing block bearing against a respective track of one of said race members, so disposed and arranged that the bearing block is mounted for bearing movement with respect to the race member, and the tracks and bearing blocks being so disposed and arranged that separative movement in any direction between the bearing block and the respective race member is restrained by at least one of said bearings, and a mounting block connected to each bearing block and adapted to clamp onto the other said race member; and
 clamp means whereby each said mounting block is immovably joined to a respective race member, and each said bearing block is joined to its respective race member in rotary shear bearing relationship, said blocks being releasably mountable in their respective manner selectively to either one of said race members.

2. A redundant-race bearing system according to claim 1 in which said clamp means is adapted to press against one of said tracks to force a respective race member into wedging retention.

3. A redundant-race bearing system according to claim 1 in which at least one of said bearings is a self-aligning bearing.

4. A redundant-race bearing system according to claim 1 in which at least one of said bearings is mounted to a pivoted arm that is spring-biased to press the respective bearing against a respective track.

5. A redundant-race bearing system according to claim 1 in which the tracks are congruently disposed on both of said race members.

6. A redundant-race bearing system according to claim 1 in which said connecting means comprises said blocks being integrally formed.

7. A redundant-race bearing system according to claim 1 in which connecting means slidingly joins said blocks together for relative radial movement.

8. A redundant-race bearing system according to claim 1 in which said mounts extend axially to interconnect axially spaced-apart races.

* * * * *